United States Patent
Abadi et al.

(10) Patent No.: US 9,720,690 B2
(45) Date of Patent: Aug. 1, 2017

(54) SOFTWARE ARCHITECTURE BY UNTANGLING UNDESIRED CODE LEVEL DEPENDENCIES USING CODE REFACTORING

(75) Inventors: Aharon Abadi, Eilat (IL); Ran Ettinger, Tel Aviv (IL); Yishai Feldman, Tel Aviv (IL); Maayan Goldstein, Holon (IL)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 13/295,073

(22) Filed: Nov. 13, 2011

(65) Prior Publication Data

US 2013/0125086 A1    May 16, 2013

(51) Int. Cl.
*G06F 9/44*    (2006.01)
(52) U.S. Cl.
CPC . *G06F 8/72* (2013.01); *G06F 8/35* (2013.01)
(58) Field of Classification Search
None
See application file for complete search history.

(56) References Cited

U.S. PATENT DOCUMENTS

| | | | |
|---|---|---|---|
| 5,307,498 A * | 4/1994 | Eisen et al. | 717/158 |
| 6,804,682 B1 * | 10/2004 | Kemper et al. | 717/120 |
| 6,807,548 B1 * | 10/2004 | Kemper | 717/120 |
| 7,512,929 B2 | 3/2009 | Sangal et al. | |
| 8,566,787 B2 * | 10/2013 | Maskeri Rama et al. | 717/120 |
| 2009/0100405 A1 | 4/2009 | Belenky et al. | |
| 2010/0042974 A1 * | 2/2010 | Gutz et al. | 717/121 |
| 2010/0070948 A1 * | 3/2010 | Rama et al. | 717/105 |
| 2010/0313179 A1 | 12/2010 | Groves et al. | |
| 2012/0096434 A1 * | 4/2012 | Rama | 717/120 |

OTHER PUBLICATIONS

Fowler, M. et al. "Refactoring: Improving the Design of Existing Code". 200 Addison-Wesley. pp. 7 and 8. Retrieved from Safari Books on Jul. 14, 2014.*
Fields, Jay, Shane Harvie, and Martin Fowler. "Refactoring: Ruby Edition". Addison-Wesley Professional, Oct. 2009. pp. 1-21, 87-91, and 101-108.*
Fowler, Martin, Don Roberts, William Opdyke, John Brant, and Kent Beck. "Refactoring: Improving the Design of Existing Code". 2000, Addison-Wesley. pp. 7-20 and 141-148. Retrieved from Safari Books on Jul. 14, 2014.*

(Continued)

*Primary Examiner* — Emerson Puente
*Assistant Examiner* — Erika Kretzmer

(57) ABSTRACT

A method of improving software architecture by untangling undesired code level dependencies is provided herein. The method includes the following stages: generating an abstract representation of a computer code in a form of a code model; recording manipulations to the computer code applied by a user to the code model; calculating a series of refactorings in the computer code that represents the recorded manipulation; and carrying out the refactorings within the computer code. Specifically, some of the refactorings include separating low level software elements on the method level in response to the user manipulations of the model.

22 Claims, 4 Drawing Sheets

(56) References Cited

OTHER PUBLICATIONS

Markovic Slavisa., "Composition of UML Described Refactoring Rules", In OCL and Model Driven Engineering, UML 2004 Conference Workshop, Oct. 12, 2004, Lisbon, Portugal, pp. 45-59.
Kniesel et al., "Static composition of refactorings", University of Bonn, Submitted for publication, Apr. 2003.
Mens et al,. "A case study to evaluate the suitability of graph transformation tools for program refactoring", Special Section on the Graph Transformation Tools Contest 2008, STTT, in this issue, 2010.
Greg Butler., "Architectural Refactoring in Framework Evolution: A Case Study", Generative Programming and Component Engineering Lecture Notes in Computer Science, 2002, vol. 2487/2002, pp. 128-139.
Abadi et al., "Fine Slicing for Advanced Method Extraction", IBM Haifa Research Lab, 2009.
Goldstein et al,. "System Grokking—A Novel Approach for Software Understanding, Validation, and Evolution", Next Generation Information Technologies and Systems Lecture Notes in Computer Science, 2009, vol. 5831/2009, pp. 38-49.
Lattix, "Lattix LDM for Eclipse Now Available", 2011. URL: http://www.lattix.com/node/60.

\* cited by examiner

SOFTWARE ARCHITECTURE BY UNTANGLING UNDESIRED CODE LEVEL DEPENDENCIES USING CODE REFACTORING

BACKGROUND

1. Technical Field

The present invention relates to software engineering and more particularly, to code refactoring applied on the code level.

2. Discussion of the Related Art

As software systems evolve, their architecture becomes more and more complicated and difficult to understand and evolve. There are multiple tools that support visualization of software systems and allow simulating architectural improvements to the system, often by using visual representations.

Currently available code visualization and refactoring tools allow detecting anti-patterns in the code and additional violations of the original architecture. Once the violations are detected, the user may wish to eliminate those dependencies. This can be often achieved by moving software elements from one software component to another. Several tools that allow removing some types of undesired relations by changing the location of a specific software element or a component are already known in the art. However, the scope of the analysis and the manipulation that those tools support is not fine-grained enough. Those tools can only move low level elements such as fields and methods from high level elements such as classes, packages, and the like.

One of the drawbacks of currently available tools is that they cannot modify methods or other low level elements to reflect specific types of architectural modifications the user may wish to perform. For example, a specified system exhibits a dependency of a component A on a component B. This dependency exists due to a specified method in A that accesses code in B. The user may wish to remove this dependency and introduce a new component C such that only C depends on B and A depends on C. This may require moving part of the specified method in A to a new method in C.

BRIEF SUMMARY

In order to overcome the drawbacks of the prior art, embodiments of the present invention apply the refactorings to the code itself and not only the model. At the code level, the user may perform more complex refactorings (such as extract computation) which are impossible to perform on models as they only represent a high level abstraction of the computer code.

Specifically, embodiments of the present invention use a model-to-code synchronization technique known in the art. However, embodiments of the present invention allow performing much more complex modification to the model and the code over the current technology. The main difference from the known art is that current solutions allow defining a composite transformation (refactoring), but usually do not apply it to the code itself.

One aspect of the present invention provides a method of improving software architecture by untangling undesired code level dependencies. The method includes the following stages: generating an abstract representation of a computer code, in a form of a code model, wherein the code model maintains at least some semantics of the computer code; recording manipulations to the computer code applied by a user to the code model; calculating a series of refactorings in the computer code that represents the recorded manipulation; and carrying out the refactorings within the computer code. Specifically, some of the refactorings include separating low level software elements on the method level in response to the user manipulations of the model.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
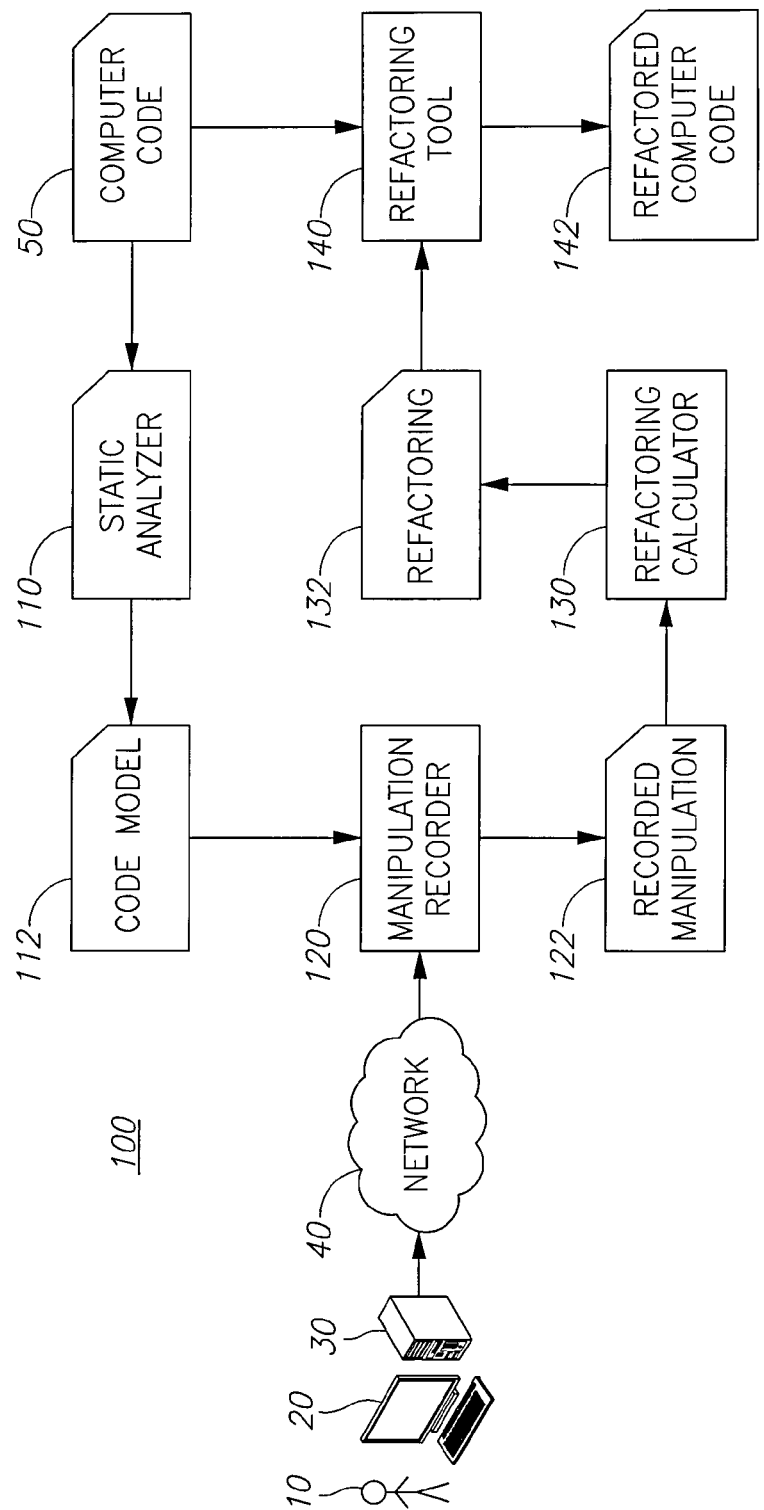
FIG. 1 is a high level schematic block diagram illustrating an exemplary system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "code refactoring" or simply "refactoring" as used herein refers to a technique for restructuring an existing computer code, altering its internal structure without changing its external behavior undertaken in order to improve some of the nonfunctional attributes of the software. Typically, this is done by applying series of "refactorings", each of which is basically a very small change in the source code that does not modify its functional requirements. Advantageously, refactoring results in a more readable code that has reduced complexity which leads to an improved maintainability of the source code, as well as a more expressive internal architecture or object model to improve extensibility.

The term "extract computation" as used herein refers to a specific technique of refactoring in which a part of a code that needs to be extracted is indicated in an arbitrary manner. When applying extract computation, the extracted code is executable on its own and preserves its original semantics. As much of the extracted code as possible is removed from its original location and replaced with a call to the extracted code. The semantics of the residual code (original code after the extraction of the extracted code) is maintained.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the present invention provide an iterative model-driven approach for code refactoring. It allows creating an abstract representation of the code, applying modifications to this abstract representation, and performing those changes in the code.

FIG. 1 is a high level schematic block diagram illustrating a non-limiting example of a system 100 implemented in a client-server configuration according to some embodiments of the present invention. System 100 may include a client computer 30 associated with a display 20 acting as user interface for user 10, wherein client computer 30 is connected via a network 40 to various components of system 100 that are carried out on the server side.

On the server side, system 100 may include a code analyzer 110 configured to generate an abstract representation of a computer code 50, in a form of a code model 112, wherein the code model 112 maintains at least some of the semantics of the computer code 50. System 100 may further include a manipulation recorder 120 configured to record manipulations 122 to the computer code applied by user 10 to the code model over display 20 and client computer 30 possibly configured as a graphical user interface that visualizes the code, and the dependencies. System 100 may further include a refactoring calculator 130 configured to calculate a series of refactorings 132 in the computer code 50 that represents the recorded manipulations 122. System 100 may further include a refactoring tool 140 configured to carry out refactorings 132 within computer code 50 on the code level.

Consistent with some embodiments of the present invention, in a case that refactorings 132 require separation of low level software elements within computer code 50, refactoring tool 140 is further configured to carry out the following operations: (i) apply static analysis to detect all software elements of the computer code relevant to the refactorings; (ii) separate the detected software elements using extract computation; (iii) create a new component configured to contain a new code comprising the separated software elements; and (iv) generate new members in the new component and move the new code to the generated new members. Specifically, the separation of low level software elements within the computer code may necessitate splitting a method into two or more components.

Consistent with some embodiments of the present invention, code analyzer 110 generates the abstract representation by applying static or dynamic analysis to the computer code, using techniques already known in the art.

Consistent with some embodiments of the present invention, manipulations 120 may include at least one of: rename a method or a class, move a method, create a new method or a class in the code, and extract computation.

Consistent with some embodiments of the present invention, refactoring tool 140 may be further configured to validate, on the code model, that the calculated refactoring maintains all of the semantics of the computer code, prior to the carrying out of the refactorings within the computer code.

Figure 2:
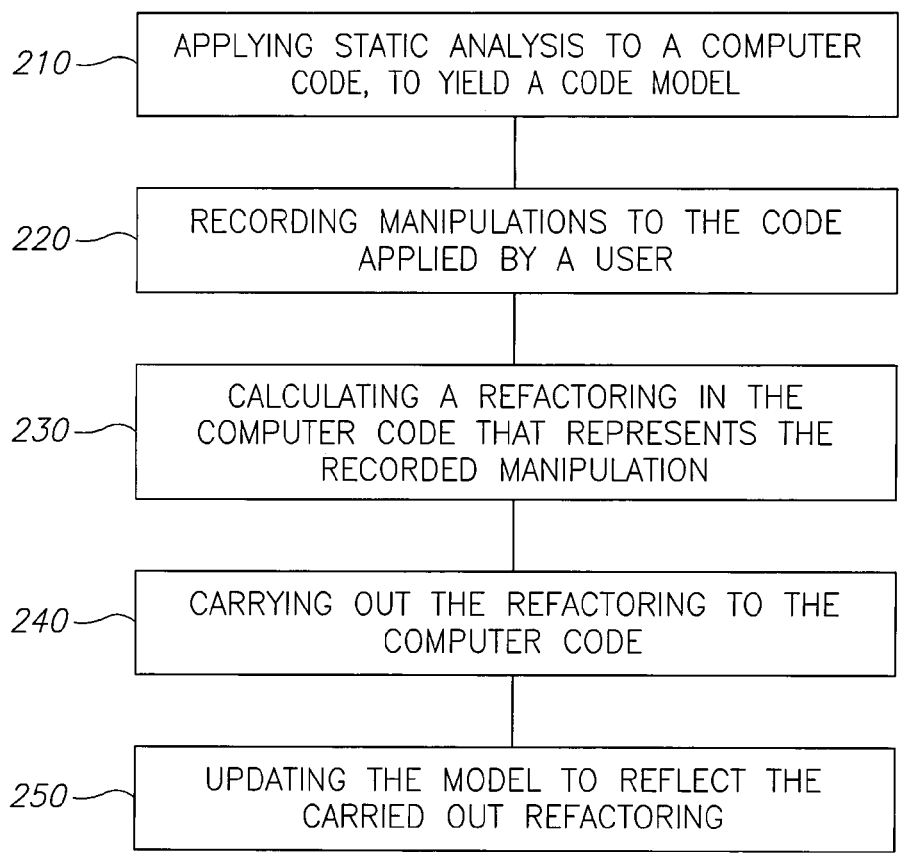
FIG. 2 is a high level schematic flowchart illustrating a method according to some embodiments of the invention.

FIG. 2 is a high level schematic flowchart illustrating a method 200 according to some embodiments of the invention. It is understood that method 200 is not limited to the aforementioned architecture of system 100. However, by way of illustration, the following stages of method 200 are described herein in conjunction with the elements of system 100.

Method 200 includes the stage of applying a static or dynamic analysis 210, possibly by code analyzer 110 to a computer code, to form an abstract representation of a computer code. A possible abstract form of a code is a code model, which is such modeled so that it maintains at least some of the semantics of the computer code.

Method 200 further includes the stage of recording manipulations 220 to the computer code applied by a user to the code model, possibly using a user interface that may include manipulation recorder 120, client computer 30, and display 20.

Method 200 further includes the stage of calculating 230 a series of refactorings in the computer code that represents the recorded manipulation. This is carried out possibly by refactoring calculator 130. Then, method 200 goes on to the stage of carrying out the refactorings 240 within the computer code, possibly by refactoring 140. Finally, method 200 goes on to the step of updating 250 the model to reflect the carried out refactoring.

Figure 3:
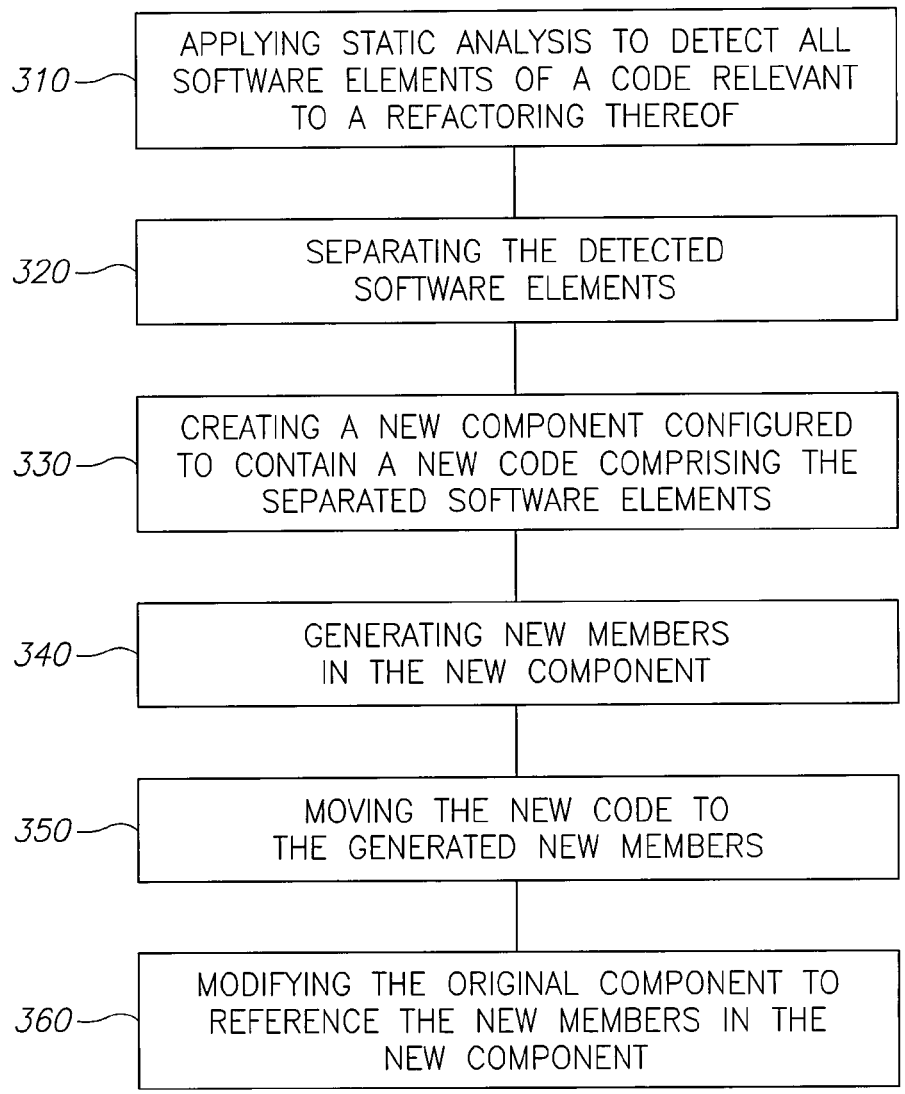
FIG. 3 is another high level schematic flowchart illustrating an aspect of a method according to some embodiments of the invention.

FIG. 3 is another high level schematic flowchart 300 illustrating an aspect of method 200 according to some embodiments of the invention. Specifically, in any case that the refactorings require separation of low level software elements within the computer code, the aforementioned stage of carrying out of the refactorings 240 may further include the following stages: applying code analysis to detect all software elements of the computer code relevant to the refactorings 310; separating the detected software elements using extract computation 320; creating a new component configured to contain a new code comprising the separated software elements 330; and generating new members in the new component 340 and moving the new code to the generated new members 350. Finally, the method goes on to the stage of modifying 360 the original component to reference the new members in the new component.

Figure 4:
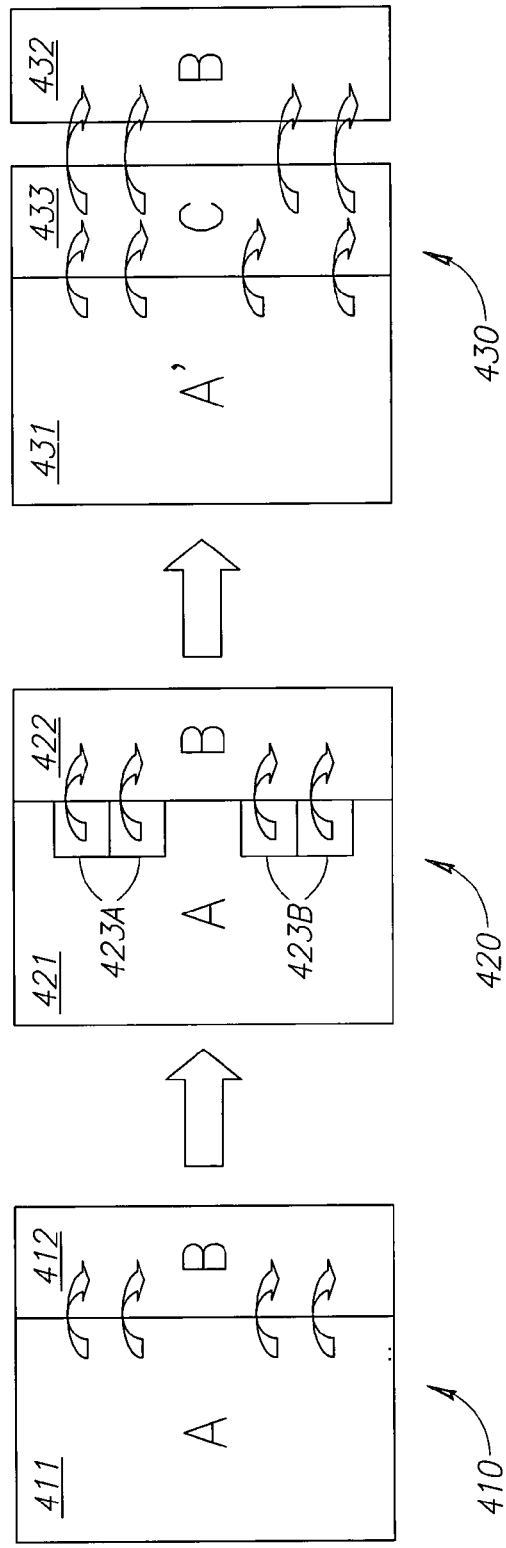
FIG. 4 is a diagram illustrating an aspect according to some embodiments of the invention.

FIG. 4 is a diagram illustrating an aspect according to some embodiments of the invention. Diagram 410 shows a representation of a computer code A 411 having dependencies (denoted by arrows) with computer code B 412. Embodiment of the present invention detect the dependencies between A 411 and B 412 based on the analysis of the code of any specified method. The user will then request from the tool to remove the dependency of A on B by creating a new component C. As shown above, embodiments of the present invention compute the changes in the code needed to be performed in order to comply with the user's request as follows. First, as shown in diagram 420 embodiments of the present invention detect all the elements 423A-423B that affect the dependency of A on B. Next, possibly by using extract computation refactoring and as shown in diagram 430, embodiments of the present invention split A into two parts such that one part denoted C 433 will contain all the functionality relevant to the detected elements 423A-423B. The other part denoted A' 431 will contain the rest of the functionality as well as references to the members in C 433 that will in turn refer to the relevant functionality in B.

Advantageously and as illustrated in the above description, embodiments of the present invention allow performing complex refactoring on code, including separation of low level software elements, such as methods. Embodiments of the present invention add and improve upon any existing solutions by allowing the user to refactor software applications at a granularity level presented only in this invention. All of the existing tools manipulate code elements by either moving, renaming it or adding new functionality. None of them can split an existing method or duplicate code to remove unwanted dependencies automatically.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written, by way of illustration only, and without limiting the scope of embodiments of the present invention, in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
generating an abstract representation of a computer code, in a form of a code model maintaining semantics and dependencies of said computer code;
visualizing said computer code on a graphical user interface (GUI);
conducting a plurality of iterations, wherein each of said iterations comprising:
applying manipulations to said code model by a user;
recording said manipulations to said code model on said graphical user interface (GUI) presenting said code model on a display;
calculating a series of code refactorings to the computer code that represents the recorded manipulations to said code model;
validating, on said code model, that said calculated series of code refactorings maintains said semantics of said computer code; and
upon successful validation, carrying out the series of code refactorings within the computer code,
wherein at least one of: the generating, the recording, the calculating, and the carrying out, is executed by a processor;
determining when the carrying out the series of code refactorings requires splitting of low level software elements within the computer code, wherein each of said low level software elements comprises at least one of a method of a class, a method of a package, a field of a class and a field of a package, of said computer code;
upon determining that splitting of low level software elements is required, the carrying out of the series of code refactorings further comprises:
applying code analysis to detect dependencies between first software elements of a first component of the computer code and second software elements of a second component of the computer code;
applying code analysis to detect dependencies between a plurality of software elements and said first software elements within said first component;
creating a new component that contains new software elements having functionalities of said first software elements;
referring said new software elements to said second software elements of the second component; and
modifying said plurality of software elements in the first component to refer to said new software elements in said new component.

2. The method according to claim 1, wherein the first software elements are separated using extract computation.

3. The method according to claim 1, wherein the series of code refactorings maintains semantics of the computer code.

4. The method according to claim 1, wherein the code analysis comprises at least one of: static analysis and dynamic analysis.

5. The method according to claim 1, wherein the new component is further split into two or more components.

6. The method according to claim 1, wherein the recorded manipulations of the code model include at least one of:

rename a method or a class, move a method, create a new method or a class in the computer code, and an extract computation.

7. The method according to claim 1, wherein the generating of the abstract representation is carried out by applying at least one of: static analysis, and dynamic analysis to the computer code.

8. The method according to claim 1, further comprising updating the code model to reflect the carried out series of code refactorings.

9. A system comprising:
a processor; a code analyzer configured to generate an abstract representation of a computer code, in a form of a code model maintaining semantics and dependencies of said computer code;
a computer configured to visualize said computer code on a GUI;
a manipulation recorder configured to record manipulations to said code model, applied by a user, on said GUI presenting said code model on a display; a refactoring calculator configured to calculate a series of code refactorings to the computer code that represents the recorded manipulations to said code model; and
a refactoring tool configured to validate, on said code model, that said calculated series of code refactorings maintains said semantics of said computer code and to carry out the series of code refactorings within the computer code, upon successful validation,
wherein the code analyzer, the manipulation recorder, the refactoring calculator, and the refactoring tool, are executed by the processor sequentially in a plurality of iterations;
determining whether the carrying out the series of code refactorings requires splitting of low level software elements within the computer code, wherein each of said low level software elements comprises at least one of a method of a class, a method of a package, a field of a class, and a field of a package, of said computer code;
upon determining that splitting of low level software elements is required, the refactoring tool:
applies code analysis to detect dependencies between first software elements of a first component of the computer code and second software elements of a second component of the computer code;
applies code analysis to detect dependencies between a plurality of software elements and said first software elements within said first component;
creates a new component that contains new software elements having functionalities of said first software elements;
refers said new software elements to said second software elements of the second component; and
modifies said plurality of software elements in the first component to refer to said new software elements in said new component.

10. The system according to claim 9, wherein the first software elements are separated using extract computation.

11. The system according to claim 9, wherein the series of code refactorings maintain semantics of the computer code.

12. The system according to claim 9, wherein the code analyzer is configured to carry out at least one of: static analysis, and dynamic analysis.

13. The system according to claim 9, wherein the new component is further split into two or more components.

14. The system according to claim 9, wherein the code analyzer generates the abstract representation by applying at least one of: static analysis, and dynamic analysis to the computer code.

15. The system according to claim 9, wherein the recorded manipulations of the code model include at least one of: rename a method or a class, move a method, create a new method or a class in the computer code, and an extract computation.

16. The system according to claim 9, further comprising a model updator configured to update the code model to reflect the carried out the series of code refactorings.

17. A non-transitory computer program product comprising:
a non-transitory computer readable storage medium having computer readable programs embodied therewith, the computer readable program comprising:
computer readable program configured to generate an abstract representation of a computer code, in a form of a code model;
computer readable program configured to visualize semantics and dependencies of said computer code on a GUI;
computer readable program configured to record manipulations to said code model, applied by a user, on said GUI presenting said code model on a display;
computer readable program configured to calculate a series of code refactorings to the computer code that represents the recorded manipulations to said code model;
computer readable program configured to validate, on said code model, that said calculated series of code refactorings maintains all of the semantics of said computer code; and
computer readable program configured to carry out the series of code refactorings within the computer code upon successful validation,
wherein the computer readable programs are executed sequentially in a plurality of iterations by a processor;
determining that the carrying out the series of code refactorings requires splitting of low level software elements within the computer code, wherein each of said low level software elements comprises at least one of a method of a class, a method of a package, a field of a class, and a field of a package, of said computer code;
upon determining that splitting of low level software elements is required, the refactoring tool:
applies code analysis to detect dependencies between first software elements of a first component of the computer code and second software elements of a second component of the computer code;
applies code analysis to detect dependencies between a plurality of software elements and said first software elements within said first component;
creates a new component that contains new software elements having functionalities of said first software elements; refers said new software elements to said second software elements of the second component; and
modifies said plurality of software elements in the first component to refer to said new software elements in said new component.

18. The non-transitory computer program product according to claim 17, wherein the first software elements are separated using extract computation.

19. The non-transitory computer program product according to claim 17, wherein the code analysis comprises at least one of: static analysis and dynamic analysis.

20. The non-transitory computer program product according to claim 17, wherein new component is further split into two or more components.

21. The non-transitory computer program product according to claim 17, wherein the recorded manipulations of the code model include at least one of: rename a method or a class, move a method, create a new method or a class in the computer code, and an extract computation.

22. The non-transitory computer program product according to claim 17, further comprising computer readable program configured to update the code model to reflect the carried out series of code refactorings.

* * * * *